United States Patent
Nomizo et al.

(10) Patent No.: US 6,758,182 B2
(45) Date of Patent: Jul. 6, 2004

(54) VARIABLE INTAKE DEVICE FOR INTERNAL COMBUSTION ENGINES AND METHOD FOR MANUFACTURING THE DEVICE

(75) Inventors: Fumio Nomizo, Toyota (JP); Hideo Nakamura, Toyota (JP); Natuhiko Katahira, Toyota (JP)

(73) Assignee: Toyota Jidosha Kabushiki Kaisha, Toyoto (JP)

( * ) Notice: Subject to any disclaimer, the term of this patent is extended or adjusted under 35 U.S.C. 154(b) by 33 days.

(21) Appl. No.: 10/167,429

(22) Filed: Jun. 14, 2002

(65) Prior Publication Data

US 2002/0195076 A1 Dec. 26, 2002

(30) Foreign Application Priority Data

Jun. 20, 2001 (JP) ........................................ 2001-186023

(51) Int. Cl.$^7$ .............................................. F02M 35/10

(52) U.S. Cl. ................................................. 123/184.57

(58) Field of Search ..................... 123/184.49, 184.36, 123/184.55, 184.21, 184.24, 184.26, 184.34, 184.35, 184.42, 184.43, 184.44, 184.47, 184.48, 184.53, 184.56, 184.61, 184.59

(56) References Cited

U.S. PATENT DOCUMENTS

| | | | |
|---|---|---|---|
| 4,636,609 A | | 1/1987 | Nakamata |
| 4,708,097 A | * | 11/1987 | Hatamura et al. ..... 123/184.36 |
| 4,736,714 A | * | 4/1988 | Hokazono et al. ..... 123/184.36 |
| 4,738,229 A | * | 4/1988 | Wada et al. ........... 123/184.55 |
| 4,794,886 A | | 1/1989 | Iwamuro et al. |

FOREIGN PATENT DOCUMENTS

JP    U 63-156421    10/1988

* cited by examiner

Primary Examiner—Tony M. Argenbright
Assistant Examiner—Hyder Ali
(74) Attorney, Agent, or Firm—Oliff & Berridge, PLC

(57) ABSTRACT

A valve body of an intake controlling valve, which is selectively opened and closed to communicate and interrupt communications between chambers which are divided by a partition wall in a resin surge tank, may be used for internal combustion engines. A variable intake device for an internal combustion engine is manufactured such that the valve unit is integrally assembled to a resin surge tank body by installing the valve unit into an opening of an outer wall of the resin surge tank and an opening of the partition wall formed at the partition wall and fixing the valve unit. Between the frame and the opening of the partition wall, and the valve unit and the opening of the outer wall are integrally fixed at their contact portions through adhesion with an adhesive or by welding.

16 Claims, 8 Drawing Sheets

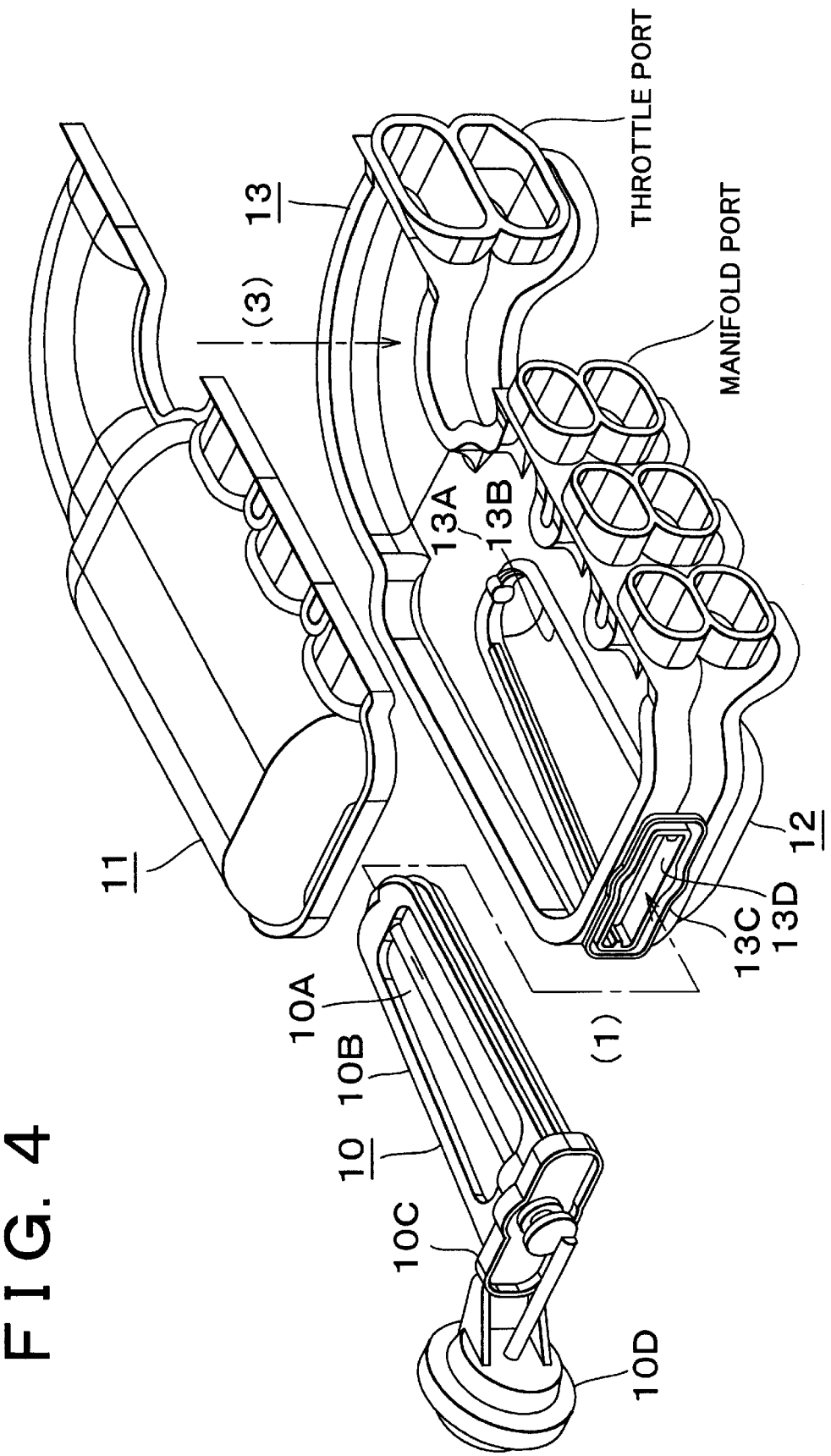

PRIOR ART

PRIOR ART

PRIOR ART

VARIABLE INTAKE DEVICE FOR INTERNAL COMBUSTION ENGINES AND METHOD FOR MANUFACTURING THE DEVICE

INCORPORATION BY REFERENCE

The disclosure of Japanese Patent Application No. 2001-186023 filed on Jun. 20, 2001, including the specification, drawings and abstract is incorporated herein by reference in its entirety.

BACKGROUND OF THE INVENTION

1. Field of Invention

The present invention relates to a variable intake device of an internal combustion engine and a method for manufacturing the device.

2. Description of Related Art

A variable intake device, in which the length of an intake tube and flow area are variable, has been developed to be used with internal combustion engines. With the internal combustion engine equipped with the variable intake device, high volumetric efficiency in a wide operation area can be secured by appropriately adjusting the cycle of the intake pulse through changes in the length of the intake tube or flow area.

A variable intake device for an internal combustion engine has been well known through a Japanese Utility Model Laid-Open Publication No. 63-156421. The variable intake device in the publication, as shown in FIG. 8, includes an intake controlling valve 51 in a surge tank 50 and adopts a system that changes the length of an intake tube 40 according to running status of the engine.

According to the variable intake device, the intake tube 40 is divided into two passages 52 and 53 by a partition wall 54 downstream from a throttle valve 60. The interior of the surge tank 50 is also divided into two chambers 55 and 56 which are connected to the passages 52 and 53 respectively. The intake tube 40 is further divided into each cylinder from both the chambers 55 and 56 through an intake manifold 61. An actual length of the intake tube is changed by communicating and interrupting communication between the chambers 55 and 56 as the intake controlling valve 51 opens and closes.

FIG. 9 shows a perspective view of the structure of a model resin surge tank provided at the variable intake device with an upper part 111 taken off. The resin surge tank includes an integrally installed structure equivalent to the intake controlling valve 51 and the passages 52 and 53 in addition to a structure equivalent to the surge tank 50 in the variable intake device shown in FIG. 8.

The surge tank mainly includes a surge tank body, which forms an outer wall of the surge tank 50, and a valve unit 110, at which the intake controlling valve 51 is provided.

The valve unit 110 mainly includes the intake throttle valve 51 and a structure for attaching the intake throttle valve 51. In the resin surge tank, the valve unit 110 is provided as an integral unit including a valve body 110A of the intake controlling valve 51, a frame 110B, an attachment flange 110C, and a driving device 110D. The attachment flange 110C is for fixing the valve unit 110 on the outer wall of the surge tank. The driving device 110D is for opening and closing the valve body 110A.

The surge tank body is divided into three parts: the upper part 111, a lower part 112, and a center part 113. The upper part mainly forms portions equivalent to an upper outer wall of the surge tank 50 and an upper outer wall of the passage 52 in FIG. 8. The lower part 112 mainly forms portions equivalent to a lower outer wall of the surge tank 50 and a lower outer wall of the passage 53 in FIG. 8. The center part 113 mainly forms portions equivalent to a side outer wall of the surge tank 50, side outer walls of the passages 52 and 53, and the partition wall 54 forming the passages 52 and 53 and both chambers 55 and 56 in FIG. 8.

Each connector for connecting a throttle body (not shown), which is provided with the intake manifold 61 and the throttle valve 60, to the resin surge tank is formed at the center part 113. A partition wall 113A (equivalent to the partition wall 54 in FIG. 8) for dividing the interior of the surge tank 50 into two chambers is also formed at the center part 113. An opening of the partition wall 113B, into which the valve unit 110 is installed, is formed at the partition wall 113A. Furthermore, an attachment flange 113C for fixing the valve unit 110 is provided at the center part 113.

Each part (111, 112, and 113) is formed from resin. Many of the parts (the frame 110B, for example) of the valve unit 110 are also formed from resin.

The above-described resin surge tank is manufactured through the following three steps:

(1) fixing each part together through welding to integrally assemble the surge tank;
(2) installing the valve unit 110 into the opening of the partition wall 113B; and
(3) tightening the attachment flanges 110 and 113 together with a bolt 114 to fix the valve unit 110 to the center part 113.

Because of the attachment structure of the above-described valve unit 110, a clearance is formed to a certain extent between the outer margins of the frame 110B and the opening of the partition wall 113B or between both the attachment flanges 110C and 113C. To obviate the above-mentioned problem, gaskets 115 and 116, which are formed from an elastic body such as rubber, are inserted into the clearance of the resin surge tank according to the present invention to secure sealing performance necessary for the resin surge tank.

The above-described variable intake device can be manufactured at low cost by forming the surge tank, in which the intake controlling valve 51 is housed from resin as described above. However, as described below, a variable intake device adopting the above-described attachment structure of the valve unit 110 has problems which must be addressed and resolved in order to further improvement of its productivity and intake performance.

The valve unit 110 of the resin surge tank is fixed to the attachment flange 110C of the valve unit 110 and to the attachment flange 113C of the center part 113 sufficiently. However, the outer margins of the frame 110B and the opening of the partition wall 113B are not completely fixed together since they are just connected through the gasket 116. Therefore, the valve unit 110 is attached to the center part 113 as a cantilever supported by the attachment flange 110C. Further, vibration from the frame 110B may be generated as an internal combustion engine vibrates. As a result, a size of the valve body 110A is restricted to avoid fatigue break of the valve unit 110 due to the vibration. Furthermore, restrictions such as the need for increasing the width and thickness of the frame 110B are also considered in designing the variable intake device. Therefore, the restrictions become obstacles to securing intake performance and lightening the resin surge tank.

SUMMARY OF THE INVENTION

The present invention has been developed in consideration of the above-mentioned problems and its object is to allow a variable intake device with a resin surge tank, in which an intake controlling valve is housed, to be manufactured more appropriately.

The following describes means to achieve the above-mentioned object and action effects of the means.

A variable intake device for an internal combustion engine according to an aspect of the present invention includes a resin surge tank including a plurality of chambers divided by a partition wall and an opening of an outer wall and a valve unit including a control valve that selectively opens and closes to communicate and interrupt between the chambers by opening and closing the partition wall and a resin frame forming a peripheral frame of the control valve, wherein the valve unit is fixed at the opening of the outer wall and integrally fixed at least at a portion of a plurality of contact portions between an opening of the partition wall and the resin frame.

A method for manufacturing the variable intake device includes the following two steps. First, a valve unit, which includes a control valve for communicating and interrupting between chambers by opening and closing a partition wall and a resin frame forming a peripheral frame of the control valve, is inserted into an opening of the outer wall of a resin surge tank, which includes the plurality of chambers divided by the partition wall and the opening of the outer wall, in order to install the periphery of the resin frame into the opening of the partition wall in the resin surge tank. Next, the laser beam for welding is radiated through a portion, at least a portion of which is formed from resin material which transmits light from a laser beam, to weld contact faces between the resin frame and the opening of the partition wall through the laser welding.

BRIEF DESCRIPTION OF THE DRAWINGS

Various exemplary embodiments of this invention will be described in detail, with reference to the following figures, wherein:

FIG. 4 is an exploded perspective view of the resin surge tank according to the first preferred embodiment;

DETAILED DESCRIPTION OF PREFERRED EMBODIMENTS

FIGS. 1–5 illustrate the first exemplary embodiment of the present invention.

Figure 8:
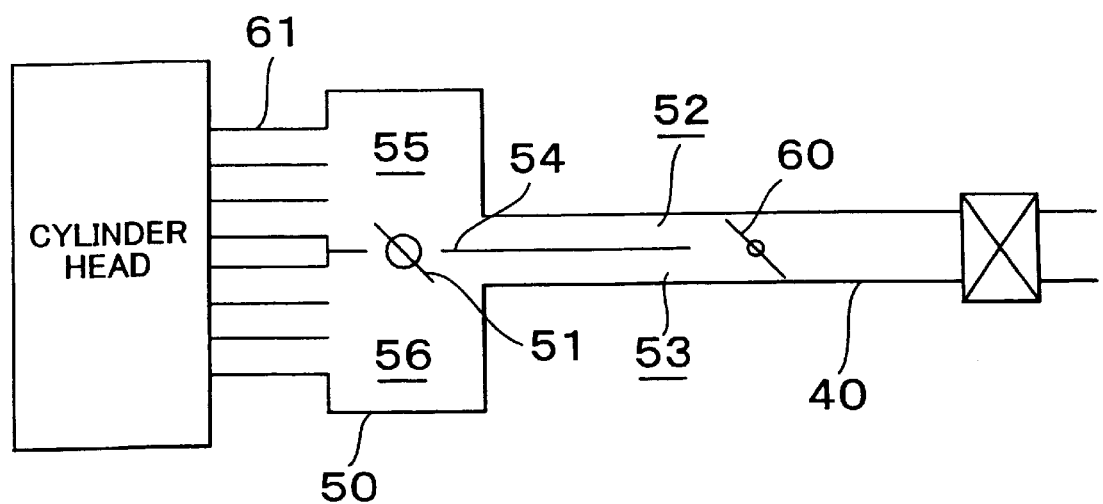
FIG. 8 is a schematic view showing the entire structure of a variable intake device for an internal combustion engine.

A variable intake device for an internal combustion engine according to the present preferred embodiment has substantially the same structure as the conventional variable intake device shown in FIG. 8. An intake tube from a throttle valve to a surge tank is divided into two passages. The interior of the surge tank is divided into two chambers by a partition wall. An actual length of the intake tube is changed by communicating and interrupting the communication between the two chambers in the surge tank as the intake controlling valve provided in the surge tank opens and closes.

Figure 9:
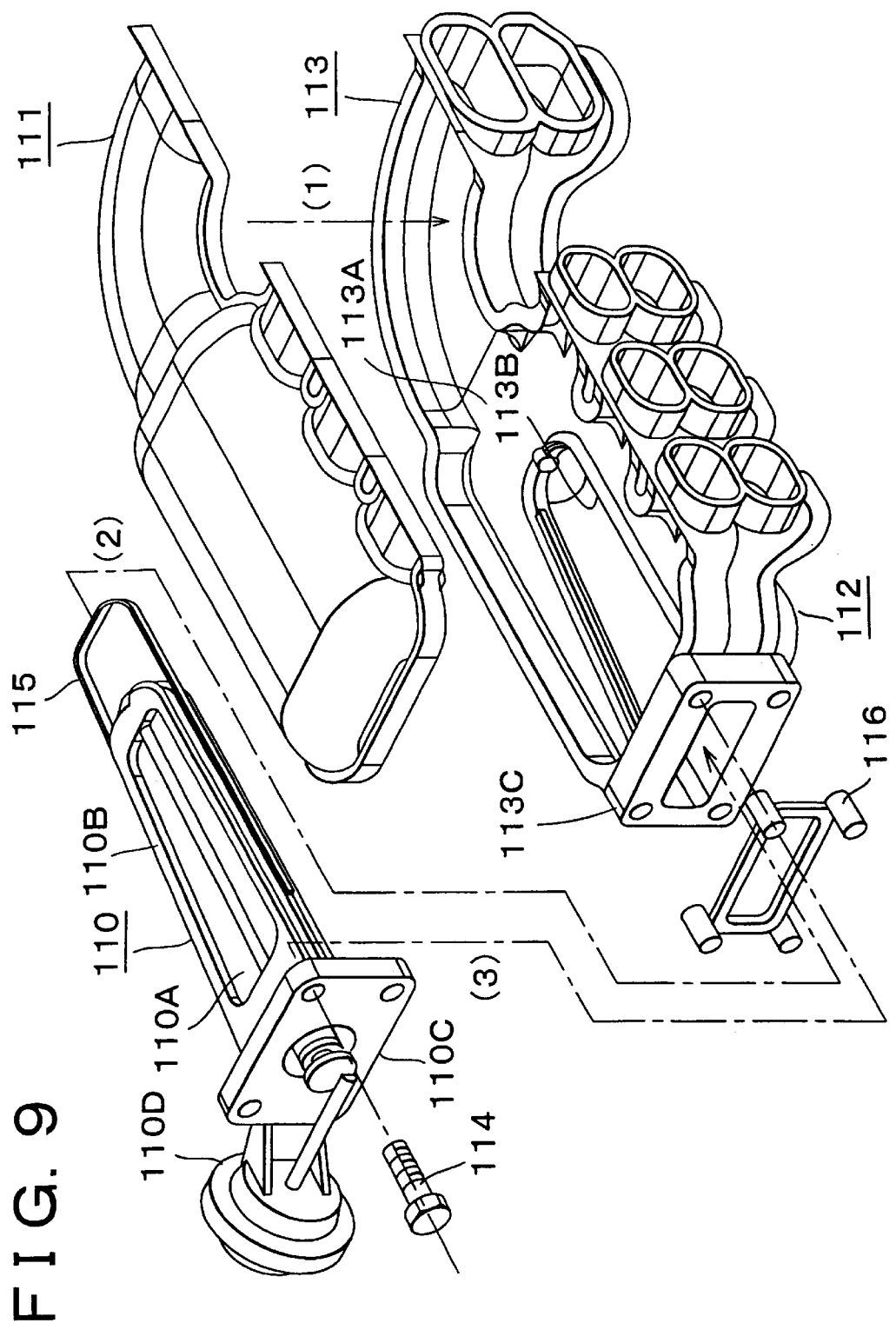
FIG. 9 is an exploded perspective view of the resin surge tank applied to the variable intake device in the internal combustion engine.

The resin surge tank, in which the intake controlling valve is provided, has basically the same structure as the resin surge tank in the conventional variable intake device shown in FIG. 9. In other words, the resin surge tank mainly includes a resin surge tank body and a valve unit 10 (refer to FIG. 1). The resin surge tank body is divided into three parts: an upper part 11, a lower part 12, and a center part 13. The valve unit 10 is installed into an opening of a partition wall 13B formed at the partition wall 13A in the resin surge tank body. The valve unit 10 has a structure, in which a valve body 10A of the intake controlling valve, frame 10B, an attachment flange 10C, and a driving device 10D of an intake throttle valve are integrally assembled. Each part (11 through 13) of the surge tank body and many parts of the valve unit 10 such as the frame 10B are also formed from resin like the resin surge tank in the conventional variable intake device.

However, an attachment structure of the valve unit in the resin surge tank, different from that in the conventional resin surge tank, is adopted according to the present preferred embodiment. The following mainly explains the differences between the variable intake device according to the present preferred embodiment and the conventional variable intake device. An explanation of common structures has been omitted.

Figure 1:
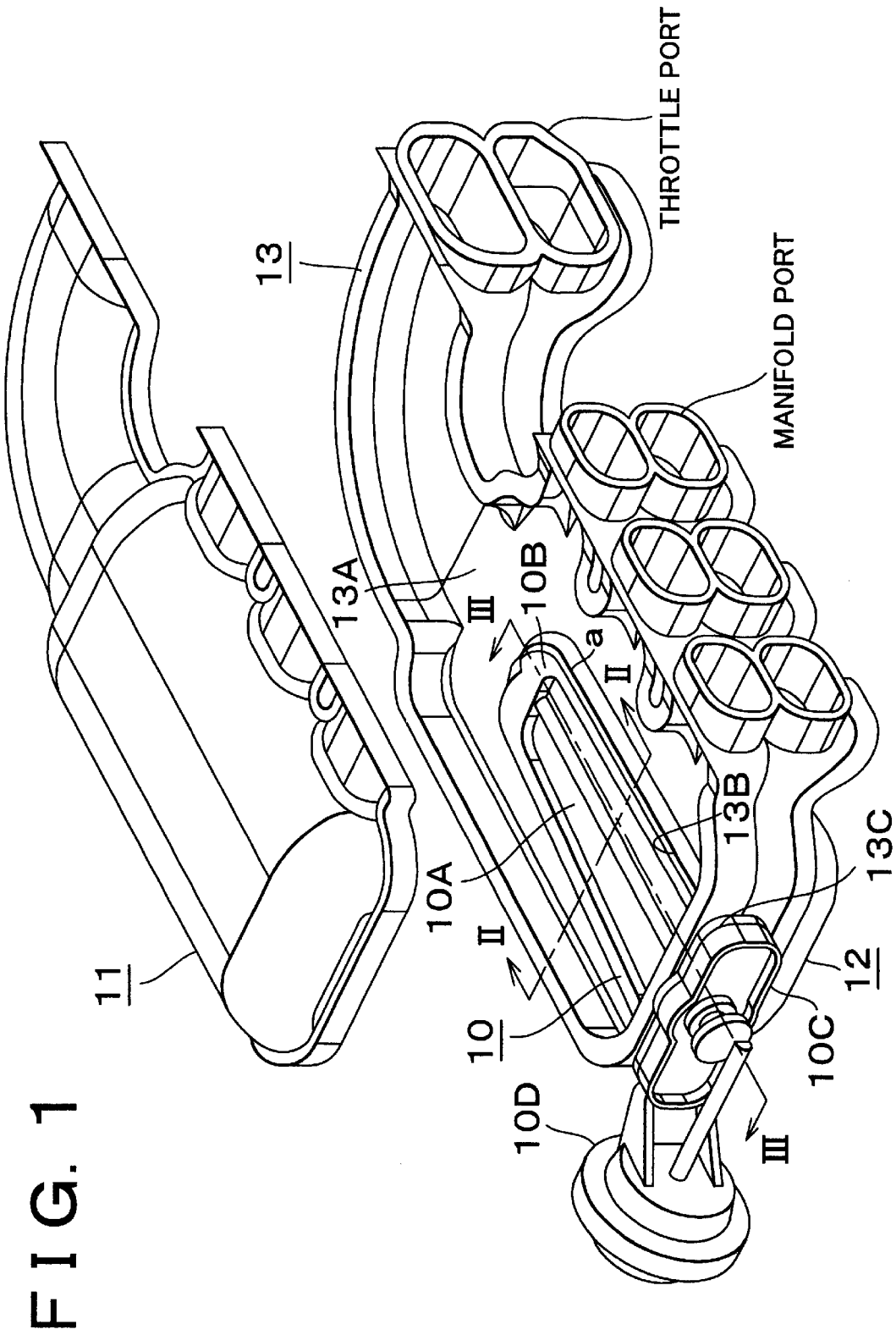
FIG. 1 is an exploded perspective view of a resin surge tank of a variable intake device for an internal combustion engine according to a first preferred embodiment.

FIG. 1 shows an exploded perspective structure of the resin surge tank of the variable intake device in the internal combustion engine according to the present preferred embodiment. According to the present preferred embodiment, the frame 10B is integrally connected with the opening of the partition wall 13B. Therefore, the resin surge tank can be manufactured in a way that valve unit 10 is fixed to the surge tank body without relying on a bolt to house the intake controlling valve in the resin surge tank.

Figure 2:
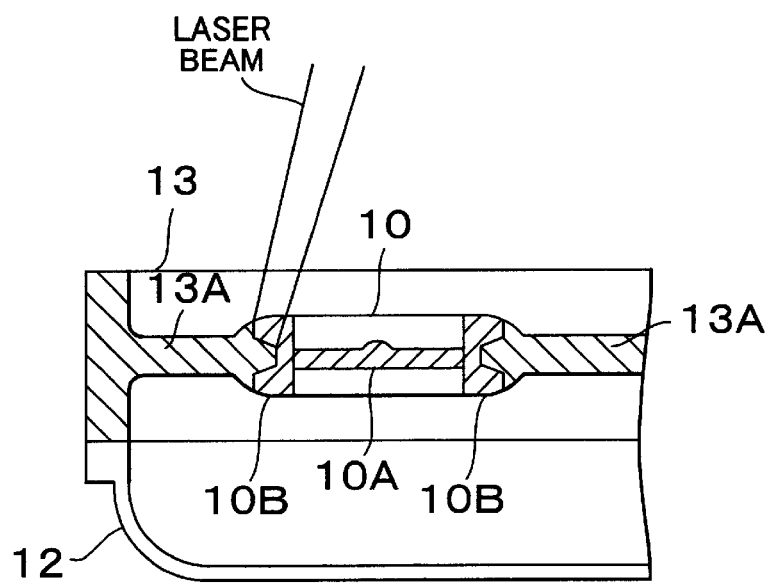
FIG. 2 is a cross-sectional view showing the cross section formed by the line II in FIG. 1.
Figure 3:
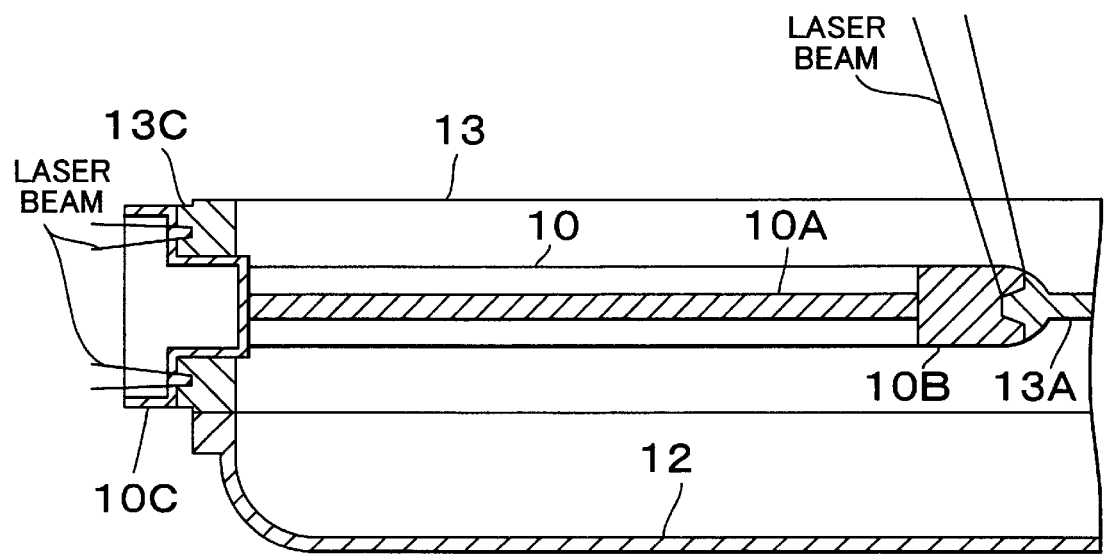
FIG. 3 is a cross-sectional view showing the cross section formed by the line III in FIG. 1.

The following explains the manufacturing order of the resin surge tank of the present preferred embodiment as referring to FIG. 2 through FIG. 4. The resin surge tank is manufactured through the following steps (1), (2), and (3) after the valve unit 10 and the parts forming the surge tank body, which are the upper part 11, the lower part 12, and the central part 13, are manufactured.

(1) Installing the Valve Unit

As the arrow (1) in FIG. 4 shows, the valve unit 10 is installed into the opening of the partition wall 13B formed at the partition wall 13A of the center part 13. According to the present preferred embodiment, the valve unit 10 is inserted from a hole 13D, which is formed on an outer wall of the center part 13 and is installed into the opening of the partition wall 13B.

According to the present preferred embodiment, the lower part 12 is integrally assembled to the center part 13 through vibration welding before the valve unit 10 is installed. Assembling the upper part 11 to the center part 13 is not carried out at this time in order to expose a connection located in the surge tank body to the outside when the valve unit 10 is connected at the step (2).

In this connection, the lower part 12 may be assembled together with the center part 13 after the valve unit 10 is connected at the step (2). The point is that when the connection is exposed to the outside by incompletely assembling the parts of the surge tank body, the following connecting works can be done easily.

(2) Connecting the Valve Unit

At this step, the installed valve unit 10 is connected with the center part 13 and fixed. According to the present preferred embodiment, the entire contact portions between the frame 10B of the valve unit 10 and the opening of the partition wall 13B of the center part 13 are integrally connected.

According to the present preferred embodiment, the attachment flange 10C and an attachment flange 13C are formed around the hole 13D on the outer wall of the center part 13 and at a base end part of the valve unit 10 respectively. At this time, both the attachment flanges 10C and 13C are integrally connected around the entire circumference of the hole 13D.

According to the present preferred embodiment, contact portions between the frame 10B and the opening of the partition wall 13B and contact portions between both the flanges 13C and 10C are connected through laser welding as shown in FIGS. 2 and 3 respectively. Laser welding between resin parts such as the frame 10B and the opening of the partition wall 13B or both the attachment flanges 13C and 10C is carried out as follows.

First, for example, between two parts A and B to be welded together, part A is formed from resin material which transmits the laser beam and part B is formed from resin material which absorbs the laser beam.

Laser beam transmission rate and laser beam absorption by resin material can be changed by a coloring agent. For example, nylon 6 and nylon 6.6, which are colored in black and widely used as resin parts in an intake device of a vehicle, absorb the energy of laser beam. When both the parts are not colored or colored with a special coloring agent, they become parts which transmit the laser beam.

Secondly, contact portions between parts A and B to be connected are met. Then, part B transmits the laser beam so that the laser beam is radiated directly to the contact portions. At this time, the radiated laser beam is absorbed by the contact portion of part A. Then, the contact portion of part A generates heat. As a result, a connecting portion of part A is melted and a connecting portion of part B is also melted due to heat conduction so that parts A and B are connected together. Through the melting and connecting, the contact portions are integrally and firmly connected together at the material level.

According to the present preferred embodiment, the valve unit 10 is formed from resin material which transmits the laser beam and the center part 13 is formed from resin material which absorbs the laser beam. As shown in FIGS. 2 and 3, the valve unit 10 transmits laser beam and the laser beam is directly radiated on contact faces between the frame 10B and the opening of the partition wall 13B and contact faces between both the attachment flanges 10C and 13C so that the contact portions of the valve unit 10 and the center part 13 are melted and connected.

According to the present preferred embodiment, either a concave portion and or a convex portion is formed on the each contact portion. A concave portion and a convex portion of connecting portions are formed to fit together. As shown in FIGS. 2 and 3, a laser beam is radiated on the concave and convex portions of the contact faces to carry out the melting and connecting.

Of course, the valve unit 10 can be connected with the center part 13 through adhesion with an adhesive.

The valve unit 10 can also be connected with the center part 13 through vibration welding, ultrasonic welding, hot plate welding, induction heating welding, and so on. However, heavy loads need to be applied to both the connecting faces and the resin parts may be deformed due to the loads when vibration welding or ultrasonic welding is carried out. When connecting the contact portions between the frame 10B, while it is arranged in the surge tank, and the opening of the partition wall 13B, it is difficult to apply the necessary loads to the connecting faces between the frame 10B and the opening of the partition wall 13B. Therefore, efficiency of the assembly process may worsen. On the other hand, the resin parts may also be deformed because of heat when hot plate welding or induction heating welding is carried out.

As described above, it is not necessary to apply heavy loads to the connecting faces, when laser welding or adhesion is carried out. In addition, the amount of heat needed for the connecting can be minimized when laser welding is carried out. Therefore, when laser welding or adhesion is employed, each part can be connected more easily and securely without being anxious about deformation of the resin parts and deterioration of work efficiency.

(3) Assembling a Cover

After connecting the valve unit 10, the upper part 11 is assembled to the center part 13 through vibration welding as the arrow (3) in FIG. 4 shows. As described above, the resin surge tank, in which the intake controlling valve is housed, is then manufactured.

In the resin surge tank manufactured in the above-described way, the contact portions between the frame 10B and the opening of the partition wall 13B are integrally connected together. Therefore, stress acting on the valve unit 10 can be supported separately by the valve unit 10 itself and the partition wall 13A. Furthermore, vibration transmitted from the valve unit 10 at the partition wall 13A can appropriately be restrained by integrating the frame 10B and the opening of the partition wall 13B. Therefore, rigidity of the valve unit 10 is heightened and required strength of the valve unit 10 is lowered.

Figure 5A:
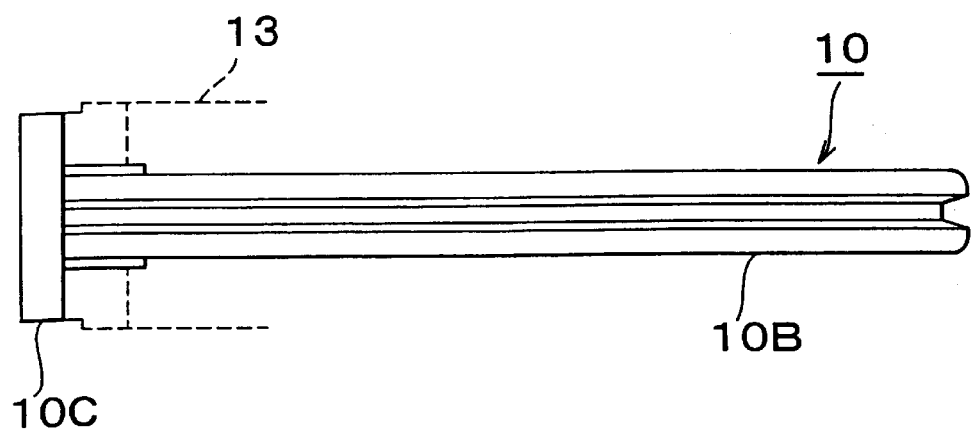
FIG. 5 is a side-view of an exemplary valve frame in variable intake devices according to the first preferred embodiment and the conventional technology.
Figure 5B:
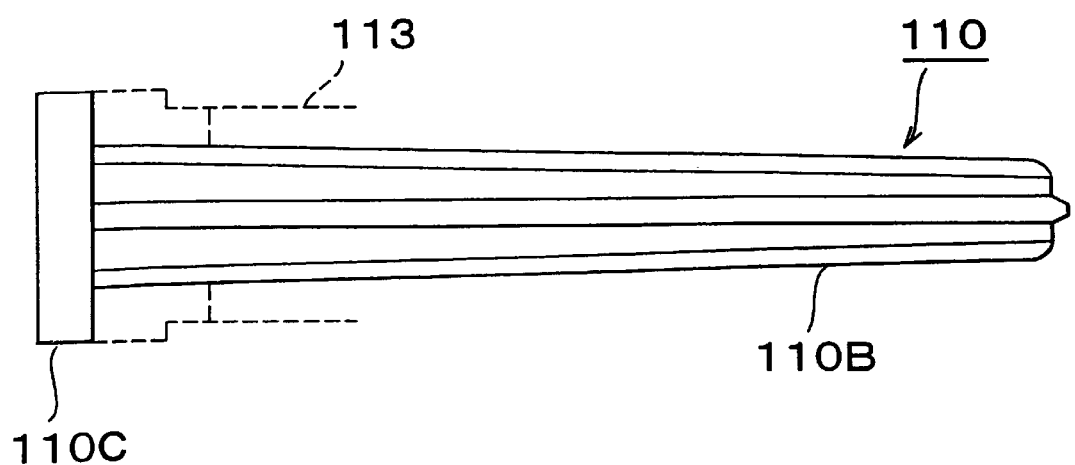

FIG. 5a shows the structure of the side of the valve unit 10 in the resin surge tank according to the present preferred embodiment. FIG. 5b shows the structure of the side of the valve unit 110 in the conventional resin surge tank shown in FIG. 9. As apparent from the comparison between both the drawings, the valve unit 10 can be formed thinner than the conventional valve unit 110 since the required strength of the valve unit 10 is lower than that of the valve unit 110. Therefore, further lightening of the valve unit 10 is possible. Furthermore, interior shape of the surge tank can be simpler as the valve unit 10 can be thinner, as described above, so that intake flow is smoother and intake performance of the internal combustion engine is improved.

When the connecting structure of the present invention is adopted, the valve unit 10 is firmly fixed not only at the base end which is the attachment flange 10C but also at the peripheral part of the frame 10B so that rigidity of the valve unit 10 is heightened. Therefore, a length of the valve unit from the attachment flange 10C to a tip part can be lengthened and upsizing of the intake throttle valve is possible without being anxious about deterioration in durability caused by vibration from the frame 10B.

The attachment flange 10C and 13C, which are formed on the valve unit 10 and the center part 13 respectively, are integrally connected through laser welding and are firmly assembled to each other without using a bolt for tightening. Therefore, parts for tightening a bolt such as a bolt and a nut are not needed. As a result, the number of parts required is decreased and work efficiency of the assembly process is improved. Therefore, downsizing of the attachment flanges 10C and 13C is possible since a space for housing a bolt and a nut is not needed. Accordingly, downsizing and lightening of the entire device has been attempted.

Furthermore, the entire contact portions between the valve unit 10 and the opening of the partition wall 13B are integrally connected and completely sealed according to the present preferred embodiment. Therefore, both the chambers divided by the partition wall 13A are appropriately sealed to each other and fluctuation of intake pressure between both the chambers is appropriately restrained from transmitting, even if a structure for securing sealing performance such as a gasket is omitted.

At the connecting portions between the attachment flanges 10C and 13C, the interior of the surge tank is appropriately sealed to the exterior of the surge tank by integrally fixing both the attachment flanges 10C and 13C through laser welding.

As briefly described before, the following fitting structure is employed at the contact portions between the valve unit 10 and the opening of the partition wall 13B and the connecting portions between the attachment flanges 10C and 13C.

According to the present preferred embodiment, a convex portion and a concave portion (a groove) facing each other are formed at the contact portions between the frame 10B and the opening of the partition wall 13B and the contact portions between both the attachment flanges 10C and 13C respectively. These convex portion and concave portions fit each like a lock and key other when the valve unit 10 is installed into the center part 13.

For example, a groove (a concave portion) extending in the installing direction of the valve unit 10 is formed around the periphery of the frame 10B. On the other hand, a convex portion also extending in the installing direction of the valve unit 10 is formed at the opening of the partition wall 13B. The convex portion fits to the groove around the periphery of the frame 10B when the valve unit 10 is installed into the center part 13. Furthermore, a groove surrounding the periphery of the hole 13D, into which the valve 10 is inserted, is formed at the attachment flange 13C of the center part 13. The groove at the attachment flange 13C fits to a convex portion formed in the same way at the attachment flange 10C when the valve unit 10 is installed into the center part 13.

The above-described convex and concave portions work as a guide to restrain the valve unit 10 from deviating from the installing direction when the valve unit 10 is installed into the center part 13. Therefore, the valve unit 10 can be installed into an appropriate position, even if the valve unit 10 or the center part 13 is distorted more or less when they are formed. In this connection, a clearance between the valve unit 10 and the center part 13 needs to be smaller than a predetermined value (equal to or less than 0.3 mm, for example) to join the valve unit 10 and the center part 13 securely. As a result of this requirement, the valve unit 10 and the center part 13 can be connected appropriately without applying heavy force to the connecting faces as long as the convex portions fit the concave portions securely. As a result, work efficiency of the assembling is improved. Furthermore, the processing accuracy required to manufacture each product can be lowered while maintaining appropriate connecting of the parts.

Force in the direction of shearing, which acts on the connecting faces, can be appropriately supported by the fitting portions after connecting when the above-described fitting structure is employed. Therefore, strength of connecting and rigidity of the valve unit 10 can be heightened.

Furthermore, when the fitting structure is employed, deterioration of sealing performance caused by the clearance is restrained, even if some clearance exists between the contact portions because of poor connecting, due to the shape of the clearance between the convex and concave portions.

When the width of a groove (a concave portion) is set somewhat larger than the width of a convex portion of each connecting portion and fitting of the convex and concave portions is carried out through interference fitting, the contact portions can be more securely connected. Therefore, securing the integral connection and sealing performance can be done more easily and securely.

According to the above-described present preferred embodiment, at least the following advantages can be achieved.

According to the present preferred embodiment, the contact portions between the frame 10B and the opening of the partition wall 13B are integrally connected through laser welding or adhesion (integration) and the valve unit 10 is fixed to the surge tank body. Therefore, the stress acting on the valve unit 10 can be supported separately by the valve unit 10 and the partition wall 13A. As a result, rigidity of the valve unit 10 can be heightened and vibration of the valve unit 10 can appropriately restrained. Therefore, the required strength of the valve unit 10 is lowered allowing further upsizing of the intake controlling valve while further lightening and thinning the valve unit. Therefore, the variable intake device equipped with the resin surge tank, in which the intake controlling valve is housed, can be manufactured in a more appropriate way. The "integration" does not mean simple integral assembly but integral connection of two resin parts at the material level through adhesion or welding. As a result, resin parts with relatively low strength can be firmly connected and formation of a clearance section at the connecting portions can be prevented. As for contact portions between the resin frame and the opening of the partition wall, the above-mentioned advantages can be achieved when the entire contact portions are integrally fixed or a portion of the contact portions are integrally connected. When the entire contact portions between the valve unit and the opening of the partition wall are integrally fixed, the contact portions can completely sealed. Therefore, a structure for securing sealing performance, such as a gasket, can be omitted.

According to the present preferred embodiment, the entire contact portions between the frame 10B and the opening of the partition wall 13B are integrally fixed and completely sealed. Therefore, fluctuation of intake pressure between both the chambers, divided by the partition wall 13A, is appropriately restrained from transmitting, even if a structure for securing sealing performance such as a gasket is omitted.

According to the present preferred embodiment, the attachment flange 10C of the valve unit 10 and the attachment flange 13C of the center part 13 are integrally fixed through laser welding. Therefore, both the attachment flanges 10C and 13C are firmly fixed without using a bolt for tightening. Therefore, parts such as a bolt and a nut are not needed. As a result of this, the number of parts is decreased and the work efficiency of the assembly process is improved. Furthermore, securing rigidity for tightening and a space for housing a bolt and a nut are not needed. Therefore, downsizing of the attachment flanges 10C and 13C is possible. As a result, downsizing and lightening of the entire device is also possible.

According to the present preferred embodiment, the attachment flanges 10C and 13C are integrally connected in a way that they surround the entire circumference of the hole 13D, into which the valve unit 10 is inserted. Therefore, sealing performance, both inside and outside, of the surge tank can appropriately be maintained without providing a gasket.

When the contact portions between the frame 10B of the valve unit 10 and the opening of the partition wall 13B or the attachment flanges 10C and 13C are connected through adhesion with an adhesive or laser welding, loads or heat applied to the connecting faces can be kept to the minimum necessary. Therefore, deformation of each part is restrained and work efficiency of the connecting can be improved.

According to the present preferred embodiment, all the contact portions between the frame 10B and the opening of the partition wall 13B and between the attachment flanges 10C and 13C are connected through laser welding. Therefore, the connecting work can be made easy because of work-sharing and communization of equipment.

According to the present preferred embodiment, the fitting structure comprising convex and concave portions is formed on the contact portions between the frame 10B and the opening of the partition wall 13B and the connecting portions between the attachment flanges 10C and 13C to restrain the valve unit 10 from deviating from the inserting direction. Therefore, stress acting on the valve unit 10 can be transmitted to the partition wall 13A. In spite of the existence of some dimensional tolerance, the valve unit can be installed into and fixed at an appropriate position by the fitting structure so that installation characteristic is improved. Furthermore, deterioration of sealing performance caused by the clearance can also be restrained since the shape of the clearance section becomes complicated by the fitting structure. Therefore, even if some clearance exists between the chambers divided by the partition wall, the valve unit will still remain in place.

According to the present preferred embodiment, all the contact portions between the frame 10B and the opening of the partition wall 13B and between the attachment flanges 10C and 13C are connected through laser welding. Formation of flash among the parts to be connected is restrained in a surge tank manufactured through connecting with means of laser welding unlike vibration welding. Therefore, with an internal combustion engine adopting the resin surge tank, sucking flash dross from the resin surge tank to an engine is restrained. Furthermore, formation of flash projecting toward the interior wall of the resin surge tank is also restrained and intake flow flowing into the internal combustion engine is not disturbed so that pressure loss of the intake flow is lowered.

Figure 6:
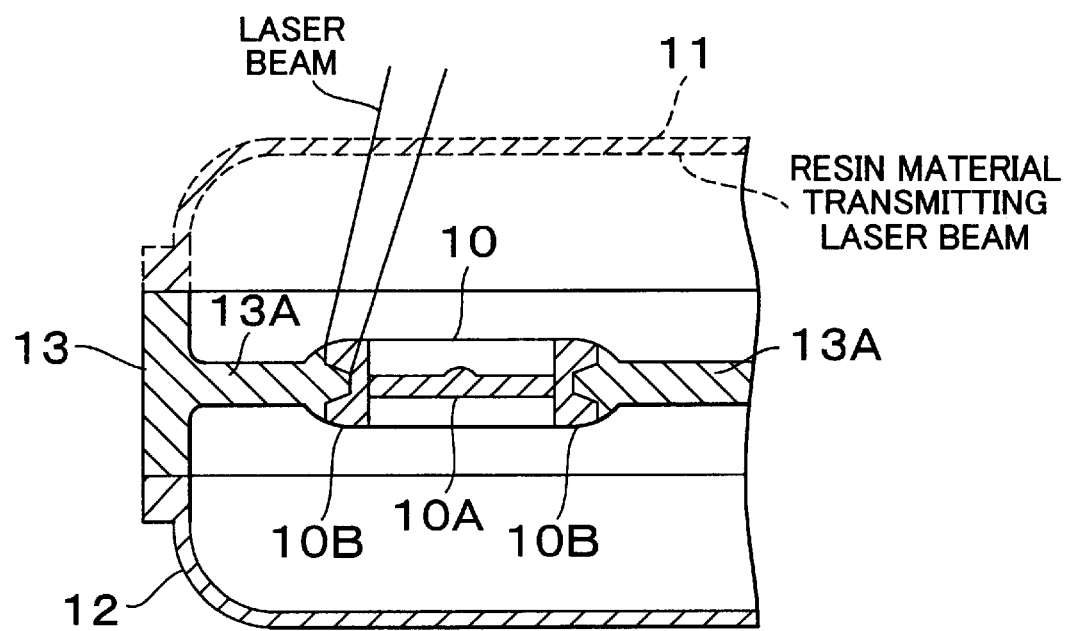
FIG. 6 is a cross-sectional view showing a resin surge tank according to a second preferred embodiment.
Figure 7:
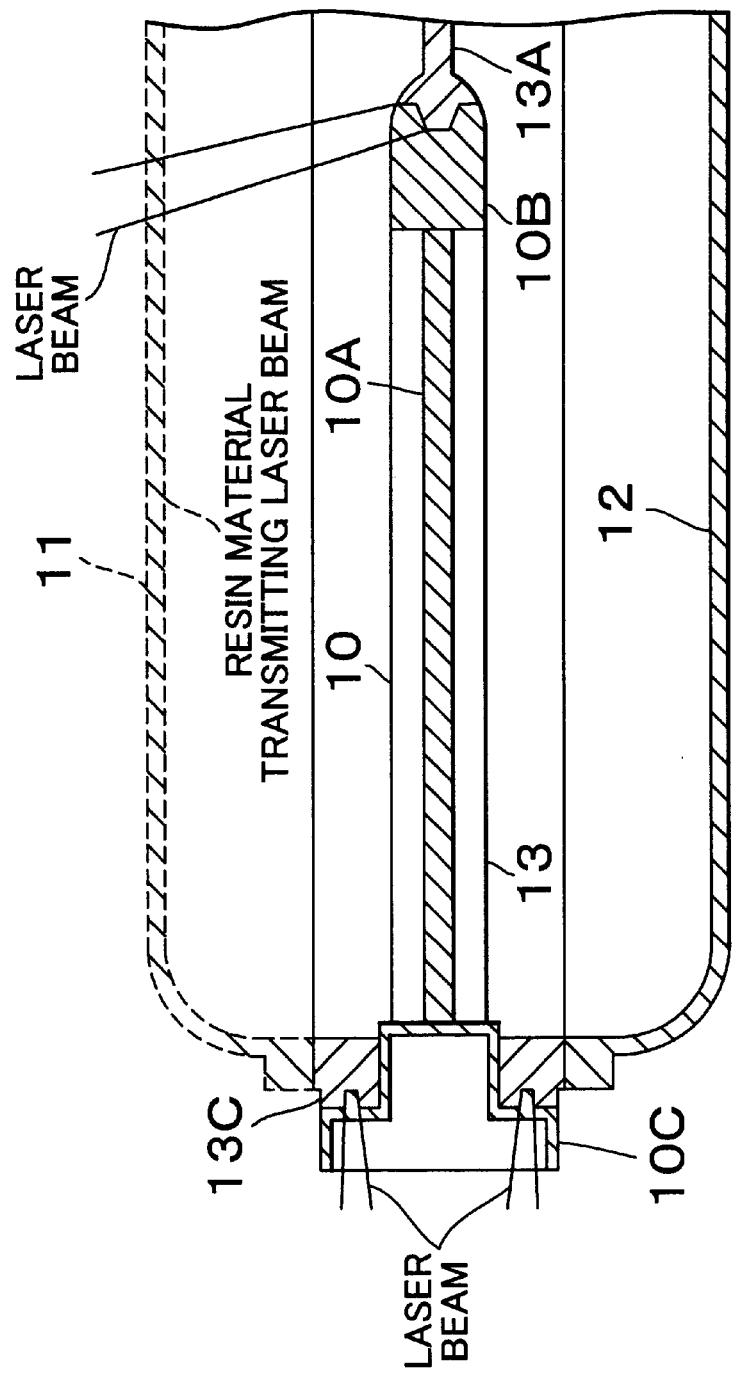
FIG. 7 is a cross-sectional view of the resin surge tank according to the second preferred embodiment.

FIGS. 6 and 7 illustrate a second preferred embodiment of the present invention mainly by showing the differences from the first preferred embodiment.

According to the first preferred embodiment, the upper part 11 is assembled to the center part 13 after the valve unit 10 and the center part 13 are connected when the resin surge tank, in which the intake controlling valve is housed, is assembled. This order of assembly is set forth due to the necessity of exposing the connecting portions connected by radiation of laser beam to the outside especially when connecting the valve unit 10 is carried out through laser welding.

However, each part may be distorted by applied loads or heat when for assembling the surge tank body (assembling the upper part 11 to the center part 13), if the resin surge tank is assembled in the above-mentioned order. Therefore, the connecting strength of the valve unit 10 installed prior to assembling the surge tank body may be lowered by the distortion. Furthermore, heavy forcing loads need to be applied to the welding faces especially when the surge tank body is assembled through vibration welding. Therefore, there is a good chance that connecting strength may be lowered by distortion of the parts and sealing performance may be lowered as a result of the lowered connecting strength.

To deal with the above-mentioned problems, a part of a surge tank body (the upper part 11 in this case) is formed from resin material which allows laser energy to be transmitted as described below according to the second preferred embodiment. Laser welding of the valve unit 10 after the surge tank body is assembled, is allowed since resin material which allows the laser beam to be transmitted is used. Therefore, anxiety about deterioration of connecting strength and the sealing performance caused by distortion of the parts is dispelled.

According to the second preferred embodiment, the upper part 11 among the resin parts comprising the surge tank body is formed from resin material which allows the laser beam to be transmitted. Like the first preferred embodiment, the valve unit 10 is formed from resin material which transmits the laser beam and the center part 13 is formed from resin material which absorbs the laser beam. The resin surge tank can be assembled through the following steps when the lower part 12 is formed from resin material which either transmits or absorbs the laser beam.

According to the present preferred embodiment, the resin surge tank is assembled through the following steps:

(1) Assembling the Surge Tank Body

First, the upper part 11, formed from resin material which transmits the laser beam and the lower part 12 are integrally assembled to the center part 13, formed from resin material which absorbs the laser beam, through, for example, vibration welding.

(2) Installing the Valve Unit

After the surge tank body is completely assembled, the valve unit 10 is inserted into the surge tank body through the hole 13D formed on the outer wall of the center part 13 and installed into the opening of the partition wall 13B.

(3) Connecting the Valve Unit

Laser welding of the valve unit 10 is carried out after its installation. At this time, as shown in FIGS. 6 and 7, laser beam for welding is radiated to each connecting portion (the contact portions between the frame 10B and the opening of the partition wall 13B and between both the attachment flanges 10C and 13C) through the upper part 11 formed from resin material which transmits the laser beam. FIGS. 6 and 7 show cross sectional structures of the resin surge tank of the present preferred embodiment corresponding to the cross sectional structures of the resin surge tank of the first preferred embodiment formed by the lines II and III in FIG. 1 respectively.

As described above, the valve unit 10 is connected through laser welding after the surge tank body is completely assembled according to the second preferred embodiment. Therefore, the valve unit 10 can be securely connected, independent of deformation of the parts such as the partition wall 13A during the assembly of the surge tank body.

Of course, the valve unit 10 can be connected with the opening of the partition wall 13B by radiating laser beam through the lower part 12 formed of resin material which transmits the laser beam. The resin tank can be assembled in the same order, even if portions of the upper part 11 and the lower part 12 are formed from resin material which transmits the laser beam. The point is that the valve unit 10, which is to be housed in the surge tank body, can be connected through laser welding even after the surge tank body is completely assembled when at least a portion of the surge tank body is formed from resin material which transmits the laser beam and the radiating laser beam which is used to contact portions to be connected is allowed through the portion. As a result of this, anxiety about deterioration of connecting strength and sealing performance caused by deformation of the parts when the serge tank body is assembled can be dispelled.

According to the above-described present preferred embodiment, the following advantage can be achieved in addition to the advantages mentioned previously.

According to the present preferred embodiment, the upper part 11, which is a portion of the outer wall of the surge tank body, is formed from resin material which transmits the laser beam used for welding. Therefore, the valve unit 10, to be housed in the surge tank body, can be connected by radiating a laser beam from outside of the surge tank body after the surge tank body is completely assembled. As a result, anxiety about deterioration of connecting strength and sealing performance caused by deformation of the parts when the serge tank body is assembled can be dispelled.

The above-described variable intake device in the internal combustion engine can be manufactured, even if the upper part 11 and the lower part 12 are assembled to the center part 13 after the valve unit 10 is fixed to the center part 13 through laser welding. In this case, however, the partition wall 13A or the valve unit 10 may be deformed when the upper part 11 and the lower part 12 are assembled to the center part 13. Therefore, the assembling characteristic and sealing performance may deteriorate. Especially when the upper part 11 and the lower part 12 are assembled to the center part 13 through vibration welding, the deformation caused by vibration or applied pressure during the assembly is likely. On the other hand, the manufacturing method according to the second preferred embodiment is independent of the above-mentioned problems since the valve unit 10 is fixed after the upper part 11 and the lower part 12 are assembled to the center part 13.

Each preferred embodiment described previously may also be altered as follows.

According to the each preferred embodiment, the valve unit 10 is formed from resin material which transmits the laser beam and the center part 13 is formed from resin material which absorbs the laser beam to allow connection of the parts through laser welding. On the other hand, both the parts can also be connected through the laser welding even if the characteristics of the resin material of both parts are reversed.

According to the each preferred embodiment, either one of the parts to be connected, which are the valve unit 10 and the center part 13, is formed from resin material which transmits the laser beam. The other part is formed from resin material which absorbs the laser beam. Therefore, laser beam is radiated directly on the contact faces between the valve unit 10 and the center part 13 through a part which transmits the laser beam. If both the parts are formed from resin materials which absorbs the laser beam, radiating the laser beam at least on a portion exposed to the outside when the valve unit 10 is assembled to the center part 13 is possible, though radiating the laser beam directly on the contact faces is impossible. If sufficient connecting strength is provided through laser welding employing the laser radiation described above, the resin surge tank can be manufactured in a way that both of the parts are formed from resin materials which absorb the laser beam and the parts are still connected through laser welding.

Though the entire circumferences of the contact portions between the frame 10B and the opening of the partition wall 13B are integrally connected according to the each preferred embodiment, rigidity of the valve unit 10 can be heightened even if a portion of the contact portions are not integrally connected.

According to the each preferred embodiment, the fitting structure is provided on the connecting portions of the contact portions between the frame 10B and the opening of the partition wall 13B and the connecting portions between the attachment flanges 10C and 13C to restrain relative deviation of the valve unit 10 from the installing direction. Therefore, further improvement of rigidity of the valve unit 10 has been attempted. However, rigidity of the valve unit 10 can also be heightened even if the above-mentioned connecting portions are integrally connected without employing the fitting structure.

Though the attachment flanges 10C and 13C formed at the valve unit 10 and the center part 13 respectively are also integrally connected through laser welding according to the each preferred embodiment, the attachment flanges may be fixed by a tightening bolt. The point is that rigidity of the valve unit 10 can be heightened if at least portions of the frame 10B and the center part 13C are integrally connected and the valve unit 10 is installed in the surge tank body.

Particulars about each part of the resin surge tank, such as how the surge tank body is divided into each part, how the valve unit comprises, and so on may be altered at will. The point is that present invention can by applied if a variable intake device with a resin surge tank in an internal combustion engine includes the following elements.

(a) a partition wall for dividing the interior of the resin surge tank into a plurality of chambers (b) a valve unit provided with an intake controlling valve and a resin frame (c) an opening of a partition wall formed on the partition wall (a) for installing the valve unit (b) into it In other words, if the variable intake device in the internal combustion engine includes the above-mentioned elements and the valve unit (b) is integrally assembled to a resin tank body by installing the valve unit (b) into the opening of the partition wall (c) and fixing the valve unit (b), the variable intake device can be manufactured more appropriately by applying the present invention.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A variable intake device for an internal combustion engine comprising:

a resin surge tank including a partition wall which divides an interior of the resin surge tank into a plurality of chambers and an outer wall which forms an opening formed on the outer wall; and a valve unit located on an opening formed at the partition wall, including a control valve and a resin frame forming a peripheral frame of the control valve, the resin frame contacts a circumference of the opening formed at the partition wall, and the valve unit is fixed at the opening of the outer wall and integrally fixed without the use of removable fasteners at at least a portion of a plurality of contact portions between the opening formed at the partition wall and the resin frame, wherein the control valve selectively opens and closes to communicate and interrupt between the chambers.

2. The variable intake device according to claim 1, wherein the valve unit is fixed to the portion of the plurality of the contact portions by welding.

3. The variable intake device according to claim 2, wherein:
   at least a portion of the outer wall of the resin surge tank is formed from a resin material which allows a laser beam used for welding to be transmitted there-through; and
   the welding is carried out by radiating the laser beam for welding on the portion of the plurality of the contact portions through the resin material which allows the laser beam for welding to be transmitted there-through.

4. The variable intake device according to claim 1, wherein the valve unit is fixed to the portion of the plurality of the contact portions by an adhesive.

5. The variable intake device according to claim 1, wherein the valve unit is fixed to the opening of the partition wall at the entire circumference of the resin frame.

6. The variable intake device according to claim 5, wherein the valve unit is fixed to the opening of the partition wall at the entire circumference of the resin frame by welding.

7. The variable intake device according to claim 6, wherein:
   at least a portion of the outer wall of the resin surge tank is formed from a resin material which allows a laser beam used for welding to be transmitted there-through; and
   the welding is carried out by radiating the laser beam for welding on the circumference of the resin frame through the resin material which allows the laser beam for welding to be transmitted there-through.

8. The variable intake device according to claim 5, wherein the valve unit is fixed to the opening of the partition wall at the entire circumference of the resin frame by an adhesive.

9. The variable intake device according to claim 1, wherein the resin frame and the opening of the partition wall include a structure to restrain relative movement thereof at the contact portions between the resin frame and the opening of the partition wall.

10. The variable intake device according to claim 1, wherein the resin frame and the opening of the partition wall include a structure to restrain relative movement thereof in a direction perpendicular to the partition wall at the contact portions between the resin frame and the opening of the partition wall.

11. The variable intake device according to claim 1, further comprising:
   a first attachment flange formed around the opening of the outer wall of the surge tank; and
   a second attachment flange formed at the valve unit and fixed with the first attachment flange at a contact portion with the first attachment flange around the opening of the outer wall when the valve unit is fixed to the opening of the partition wall.

12. The variable intake device according to claim 11, wherein fixation between the first attachment flange and the second attachment flange is carried out through welding.

13. The variable intake device according to claim 12, wherein:
   at least a portion of the second attachment flange is formed from a resin material which allows a laser beam for welding to be transmitted there-through;
   the first attachment flange contacting the contact portion is formed from a resin material which absorbs the laser beam used for welding; and
   the welding is carried out by radiating the laser beam for welding on the contact portion through the second attachment flange allowing the laser beam for the welding to be transmitted there-through.

14. The variable intake device according to claim 11, wherein fixation between the first attachment flange and the second attachment flange is carried out with an adhesive.

15. A method for manufacturing a variable intake device for an internal combustion engine comprising the steps of:
   inserting a valve unit, which includes a control valve that selectively opens and closes to communicate and interrupt between a plurality of chambers divided by a partition wall in a surge tank, and a resin frame forming a peripheral frame of the control valve, into an opening of an outer wall of the resin surge tank that includes the opening of the outer wall, to contact the resin frame of the valve unit with an opening of the partition wall in the resin surge tank; and
   radiating a laser beam for welding through a contact portions at least a portion of which is formed from a resin material which transmits the laser beam, to weld the contact portion between the resin frame and the opening of the partition wall through laser welding.

16. A method for manufacturing a variable intake device for an internal combustion engine comprising the steps of:
   integrally assembling a first part, formed from a resin material which transmits a laser beam used for welding, including at least a portion of an outer wall of a resin surge tank, which includes a plurality of chambers divided by a partition wall and an opening of the outer wall, and a second part, formed from a resin material which absorbs the laser beam used for welding, including at least a portion of a contact portions around an opening of the partition wall of the resin surge tank;
   installing a valve unit, which includes a control valve that selectively opens and closes to communicate and interrupt between the plurality of chambers and a resin frame forming a peripheral frame of the control valve, into the opening of the partition wall, which divides an interior of the resin surge tank into the plurality of chambers; and
   welding the resin frame and the opening of the partition wall by radiating the laser beam for welding through the first part after the first part and the second part are assembled and the valve unit is installed into the opening of the partition wall.

* * * * *